United States Patent
Oh et al.

(10) Patent No.: US 12,479,943 B2
(45) Date of Patent: Nov. 25, 2025

(54) OIL-EXTENDED MODIFIED CONJUGATED DIENE-BASED POLYMER, METHOD FOR PREPARING SAME AND RUBBER COMPOSITION COMPRISING SAME

(71) Applicant: LG CHEM, LTD., Seoul (KR)

(72) Inventors: Kyoung Hwan Oh, Daejeon (KR); You Seok Seo, Daejeon (KR); Jae Sun Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 533 days.

(21) Appl. No.: 17/797,290

(22) PCT Filed: Oct. 12, 2021

(86) PCT No.: PCT/KR2021/014038
§ 371 (c)(1),
(2) Date: Aug. 3, 2022

(87) PCT Pub. No.: WO2022/080826
PCT Pub. Date: Apr. 21, 2022

(65) Prior Publication Data
US 2023/0108559 A1 Apr. 6, 2023

(30) Foreign Application Priority Data

Oct. 12, 2020 (KR) .................. 10-2020-0130966
Oct. 8, 2021 (KR) .................. 10-2021-0134337

(51) Int. Cl.
*C08F 236/10* (2006.01)
*C08K 3/04* (2006.01)
*C08K 3/36* (2006.01)

(52) U.S. Cl.
CPC .............. *C08F 236/10* (2013.01); *C08K 3/04* (2013.01); *C08K 3/36* (2013.01)

(58) Field of Classification Search
CPC ............ C08F 236/10; C08K 3/04; C08K 3/36
USPC ...................................................... 524/572
See application file for complete search history.

(56) References Cited

U.S. PATENT DOCUMENTS

| | | |
|---|---|---|
| 4,397,994 A | 8/1983 | Takeuchi et al. |
| 2009/0203843 A1 | 8/2009 | Fukuoka et al. |
| 2013/0289183 A1 | 10/2013 | Kerns et al. |
| 2014/0155543 A1 | 6/2014 | Soddu et al. |
| 2014/0371383 A1 | 12/2014 | Hayata et al. |
| 2016/0068659 A1 | 3/2016 | Moutinho et al. |
| 2018/0148567 A1 | 5/2018 | Papakonstantopoulos et al. |
| 2019/0194430 A1 | 6/2019 | Morishita et al. |
| 2020/0087489 A1 | 3/2020 | Isitman et al. |
| 2020/0115485 A1* | 4/2020 | Kim ................... B60C 1/0041 |
| 2020/0231788 A1* | 7/2020 | Lee ...................... C08L 9/06 |
| 2020/0354482 A1 | 11/2020 | Lee et al. |
| 2021/0079124 A1 | 3/2021 | Lee et al. |
| 2021/0301046 A1 | 9/2021 | Sekikawa et al. |

FOREIGN PATENT DOCUMENTS

| | | | |
|---|---|---|---|
| EP | 3502145 A | 6/2019 | |
| EP | 3536720 A1 * | 9/2019 | ............... C08K 3/36 |
| JP | 2000-178378 A | 6/2000 | |
| JP | 2003-171418 A | 6/2003 | |
| JP | 2004-067987 A | 3/2004 | |
| JP | 2018-172593 A | 11/2018 | |
| JP | 2019-031659 A | 2/2019 | |
| JP | 2020-012101 A | 1/2020 | |
| JP | 2021-107499 A | 7/2021 | |
| KR | 2009-0008478 A | 1/2009 | |
| KR | 10-2012-0126854 A | 11/2012 | |
| KR | 10-2013-0121059 A | 11/2013 | |
| KR | 10-2014-0044872 A | 4/2014 | |
| KR | 10-2015-0130779 A | 11/2015 | |
| KR | 10-2016-0012135 A | 2/2016 | |
| KR | 2016-0032708 A | 3/2016 | |
| KR | 10-2016-0067489 A | 6/2016 | |
| KR | 10-2019-0016902 A | 2/2019 | |
| KR | 2019-0066564 A | 6/2019 | |

(Continued)

OTHER PUBLICATIONS

Office Action issued on Oct. 2, 2023 for the corresponding Japanese patent application 2022-548187.
Extended European Search Report issued in application 21880473.0 dated Jun. 20, 2023.
Office Action issued in Korean application 10-2021-0134337 dated Jul. 3, 2023.
Sahasrabudhe et al., "Density, viscosity, and surface tension of five vegetable oils at elevated temperatures: Measurement and modeling," International Journal of Food Properties, vol. 20, No. S2: S1965-S1981 (2017).
International Search Report (with partial translation) and Written Opinion dated Jan. 24, 2022, for corresponding International Patent Application No. PCT/KR2021/014038.

*Primary Examiner* — Deve V Hall
(74) *Attorney, Agent, or Firm* — Morgan, Lewis & Bockius LLP

(57) ABSTRACT

The present invention relates to an oil-extended modified conjugated diene-based polymer having excellent tensile properties and abrasion resistance, a method for preparing same and a rubber composition including same, and provides an oil-extended modified conjugated diene-based polymer including a modified polymer chain including a repeating unit derived from a conjugated diene-based monomer and a functional group derived from an aminoalkoxysilane-based modifier; and a derived unit from a vegetable oil, wherein at least one of the modified polymer chain is coupled with the derived unit from vegetable oil, N and Si atoms are included in 100 ppm or more each based on a total weight of the polymer, two glass transition temperatures of Tg1 and Tg2 measured by differential scanning calorimetry (DSC) are shown, Tg1 is $-80°$ C. to $-20°$ C., Tg2 is $-50°$ C. to $30°$ C., and Tg2 is higher than Tg1, a method for preparing same and a rubber composition including same.

15 Claims, No Drawings

(56) References Cited

FOREIGN PATENT DOCUMENTS

| KR | 10-2019-0128580 A | 11/2019 | | |
|----|-------------------|---------|---|---|
| KR | 10-2020-0031529 A | 3/2020 | | |
| WO | 2013-031599 A1 | 3/2013 | | |
| WO | WO-2019112260 A1 * | 6/2019 | ........... | B60C 1/0016 |
| WO | WO-2019112262 A1 * | 6/2019 | ............. | C08C 19/25 |

* cited by examiner

OIL-EXTENDED MODIFIED CONJUGATED DIENE-BASED POLYMER, METHOD FOR PREPARING SAME AND RUBBER COMPOSITION COMPRISING SAME

TECHNICAL FIELD

CROSS-REFERENCE TO RELATED APPLICATIONS

The present application claims the benefit of priority based on Korean Patent Application Nos. 10-2020-0130966, filed on Oct. 12, 2020, and 10-2021-0134337, filed on Oct. 8, 2021, the entire contents of which are incorporated herein by reference.

TECHNICAL FIELD

The present invention relates to an oil-extended modified conjugated diene-based polymer which has excellent processability, abrasion resistance, tensile properties and rolling resistance, a method for preparing same and a rubber composition including same.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If such a solution-polymerized SBR is used as a rubber material for tires, the physical properties required for tires, such as running resistance and braking force may be controlled by increasing the vinyl content in the SBR to increase the glass transition temperature of rubber, and also, fuel consumption may be reduced by suitably controlling the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a technique of coupling active anions of the chain terminals of a polymer obtained by polymerizing styrene-butadiene using alkyl-lithium which is a monofunctional initiator in a non-polar solvent, using a coupling agent such as a tin compound.

In addition, in order to improve the processability of the solution-polymerized SBR, oil-extended SBR has been developed and used.

The oil-extended SBR is generally prepared by preparing SBR through emulsion polymerization or solution polymerization, adding petroleum-based oil prior to removing solvents, and then, removing the solvents, and the processability of the SBR is improved through the remaining of the petroleum-based oil in the polymer. If applied to a rubber composition, such oil-extended SBR has properties including being easily compounded with other rubbers and additives, being not easily decomposed during processing and providing excellent properties to a final product, and is used in diverse fields to obtain a number of beneficial characteristics.

However, since the petroleum-based oil brings about diverse environmental issues, and there is a rising interest on a product which has effective properties of oil-extended SBR as well as eco-friendliness and applicability to diverse industries.

PRIOR ART DOCUMENTS (Patent Document 1) U.S. Pat. No. 4,397,994 A
(Patent Document 2) KR10-2020-0031529 A

DISCLOSURE OF THE INVENTION

Technical Problem

The present invention has been devised to solve the above-mentioned problems of the related arts, and an object of the present invention is to provide an oil-extended modified conjugated diene-based polymer including a derived unit from a vegetable oil and having excellent processability and viscoelasticity properties as well as excellent abrasion resistance and tensile properties.

In addition, an object of the present invention is to provide a method for preparing an oil-extended modified conjugated diene-based polymer, including a step of mixing a polymer and a vegetable oil prior to finishing polymerization.

Also, an object of the present invention is to provide a rubber composition including the oil-extended modified conjugated diene-based polymer and having excellent tensile properties, abrasion resistance, viscoelasticity properties and processability properties.

Technical Solution

To solve the above-described tasks, according to an embodiment of the present invention, the present invention provides an oil-extended modified conjugated diene-based polymer comprising: a modified polymer chain comprising a repeating unit derived from a conjugated diene-based monomer and a functional group derived from an aminoalkoxysilane-based modifier; and a derived unit from a vegetable oil, wherein at least one of the modified polymer chain is coupling bonded with the derived unit from a vegetable oil, N and Si atoms are comprised in 100 ppm or more each based on a total weight of the polymer, two glass transition temperatures of Tg1 and Tg2 measured by differential scanning calorimetry (DSC) are shown, the Tg1 is from −80° C. to −20° C., the Tg2 is from −50° C. to 30° C., and the Tg2 is higher than the Tg1.

In addition, the present invention provides a method for preparing an oil-extended modified conjugated diene-based polymer, comprising: polymerizing a conjugated diene-based monomer, or a conjugated diene-based monomer and an aromatic vinyl-based monomer, in the presence of a polymerization initiator in a hydrocarbon solvent to prepare an active polymer (S1); reacting or coupling the active polymer with an aminoalkoxysilane-based modifier to prepare a modified polymer (S2); and mixing the modified polymer with a vegetable oil (S3).

Also, the present invention provides a rubber composition comprising the oil-extended modified conjugated diene-based polymer and a filler.

(1) The present invention provides an oil-extended modified conjugated diene-based polymer comprising: a modified polymer chain comprising a repeating unit derived from a conjugated diene-based monomer and a functional group derived from an aminoalkoxysilane-based modifier; and a derived unit from a vegetable oil, wherein at least one of the modified polymer chain is coupling bonded with the derived unit from a vegetable oil, N and Si atoms are comprised in 100 ppm or more each based on a total weight of the polymer, two glass transition temperatures of Tg1 and Tg2 measured by differential scanning calorimetry (DSC) are shown, the Tg1 is from −80° C. to −20° C., the Tg2 is from −50° C. to 30° C., and the Tg2 is higher than the Tg1.

(2) The present invention provides the oil-extended modified conjugated diene-based polymer in (1) above, wherein the derived unit from a vegetable oil is comprised in 10 parts by weight to 60 parts by weight based on 100 parts by weight of the polymer.

(3) The present invention provides the oil-extended modified conjugated diene-based polymer in (1) or (2) above, wherein the vegetable oil has a density of 0.90 g/cm³ to 0.95 g/cm³.

(4) The present invention provides the oil-extended modified conjugated diene-based polymer in any one of (1) to (3) above, wherein the Tg1 is from −60° C. to −30° C., and the Tg2 is from −40° C. to 20° C.

(5) The present invention provides the oil-extended modified conjugated diene-based polymer in any one of (1) to (4) above, wherein the vegetable oil is one or more selected from the group consisting of soybean oil, rapeseed oil, canola oil, sunflower oil, linseed oil, rice bran oil, palm oil, olive oil, peanut oil, oil palm oil, cottonseed oil, and coconut oil.

(6) The present invention provides the oil-extended modified conjugated diene-based polymer in any one of (1) to (5) above, wherein the modified polymer chain further comprises a repeating unit derived from an aromatic vinyl-based monomer.

(7) The present invention provides the oil-extended modified conjugated diene-based polymer in any one of (1) to (6) above, having molecular weight distribution of 1.0 to 2.0.

(8) The present invention provides the oil-extended modified conjugated diene-based polymer in any one of (1) to (7) above, wherein the aminoalkoxysilane-based modifier is one or more selected from compounds represented by Formula 1 to Formula 3 below.

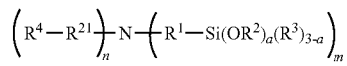

[Formula 1]

In Formula 1,
$R^1$ is a single bond, or an alkylene group of 1 to 10 carbon atoms,
$R^2$ and $R^3$ are each independently an alkyl group of 1 to 10 carbon atoms,
$R^4$ is hydrogen, an epoxy group, an alkyl group of 1 to 10 carbon atoms, an allyl group of 2 to 10 carbon atoms, a mono-substituted, di-substituted or tri-substituted alkylsilyl group with alkyl groups of 1 to 10 carbon atoms, or a heterocyclic group of 2 to 10 carbon atoms,
$R^{21}$ is a single bond, an alkylene group of 1 to 10 carbon atoms, or —[$R^{42}$O]$_j$—, where $R^{42}$ is an alkylene group of 1 to 10 carbon atoms, and j is an integer selected from 1 to 30,
a and m are each independently an integer selected from 1 to 3, and n is an integer of 0 to 2.

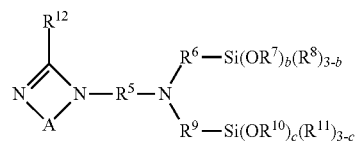

[Formula 2]

In Formula 2,
$R^5$, $R^6$ and $R^9$ are each independently an alkylene group of 1 to 10 carbon atoms,
$R^7$, $R^8$, $R^{10}$ and $R^{11}$ are each independently an alkyl group of 1 to 10 carbon atoms,
$R^{12}$ is hydrogen or an alkyl group of 1 to 10 carbon atoms,
b and c are each independently 1, 2 or 3, where b+c ≥4 is satisfied, and
A is

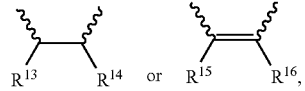

where $R^3$, $R^{14}$, $R^{15}$ and $R^{16}$ are each independently hydrogen or an alkyl group of 1 to 10 carbon atoms.

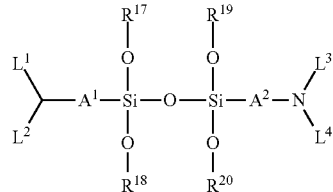

[Formula 3]

In Formula 3,
$A^1$ and $A^2$ are each independently a divalent hydrocarbon group of 1 to 20 carbon atoms, which includes or excludes an oxygen atom,
$R^{17}$ and $R^{20}$ are each independently a monovalent hydrocarbon group of 1 to 20 carbon atoms, $L^1$ to $L^4$ are each independently a mono-substituted, di-substituted or tri-substituted alkylsilyl group with alkyl groups of 1 to 10 carbon atoms, or a monovalent hydrocarbon group of 1 to 20 carbon atoms, or $L^1$ and $L^2$, and $L^3$ and $L^4$ are connected with each other to form rings of 1 to 5 carbon atoms, respectively, and if $L^1$ and $L^2$, and $L^3$ and $L^4$ are connected with each other to form rings, respectively, the rings formed comprise one to three of one or more types of heteroatoms selected from the group consisting of N, O and S.

(9) The present invention provides a method for preparing the oil-extended modified conjugated diene-based polymer, comprising: polymerizing a conjugated diene-based monomer, or a conjugated diene-based monomer and an aromatic vinyl-based monomer, in the presence of a polymerization initiator in a hydrocarbon solvent to prepare an active polymer (S1); reacting or coupling the active polymer with an aminoalkoxysilane-based modifier to prepare a modified polymer (S2); and mixing the modified polymer with a vegetable oil (S3).

(10) The present invention provides the method for preparing the oil-extended modified conjugated diene-based polymer in (9) above, wherein the polymerization initiator is used in 0.01 mmol to 10 mmol based on total 100 g of the monomer.

(11) The present invention provides the method for preparing the oil-extended modified conjugated diene-based polymer in (9) above, wherein the modifier is used in 0.1 mol to 10 mol based on 1 mol of the polymerization initiator.

(12) The present invention provides the method for preparing the oil-extended modified conjugated diene-based polymer in (9) above, wherein the vegetable oil is used in 10 parts by weight to 60 parts by weight based on 100 parts by weight of the modified polymer.

(13) The present invention provides the method for preparing the oil-extended modified conjugated diene-based polymer in (9) or (12) above, wherein the vegetable oil is one or more selected from the group consisting of soybean oil, rapeseed oil, canola oil, sunflower oil, linseed oil, rice bran oil, palm oil, olive oil, peanut oil, oil palm oil, cottonseed oil, and coconut oil.

(14) The present invention provides a rubber composition comprising the oil-extended modified conjugated diene-based polymer; and a filler.

(15) The present invention provides the rubber composition in (14) above, wherein the filler is one or more selected from a silica-based filler and a carbon black-based filler.

Advantageous Effects

The oil-extended modified conjugated diene-based polymer according to the present invention includes a modified polymer chain including a functional group derived from an aminoalkoxysilane-based modifier and a derived unit from a vegetable oil, and at least one of the modified polymer chain is coupling bonded with the derived unit from a vegetable oil, and accordingly, excellent effects of tensile properties and running resistance may be shown, further, since the derived unit from a vegetable oil is included in a specific range in the polymer, Tg1 and Tg2 are shown, and accordingly, improving effects of abrasion resistance and processability may be shown.

The method for preparing an oil-extended modified conjugated diene-based polymer according to the present invention includes a step of mixing a polymer with a vegetable oil prior to finishing polymerization activation so that a modified polymer chain reacts and coupling bonded with the vegetable oil to easily prepare an oil-extended modified conjugated diene-based polymer having excellent tensile properties and running resistance, and improved abrasion resistance and processability, simultaneously.

In addition, since the rubber composition according to the present invention includes the oil-extended modified conjugated diene-based polymer, effects of easy compounding, and excellent tensile properties, running resistance, processability and abrasion resistance may be achieved.

BEST MODE FOR CARRYING OUT THE INVENTION

Hereinafter, the present invention will be described in more detail to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

DEFINITION OF TERMS

In the present disclosure, the term "polymer" refers to a polymer compound prepared by polymerizing monomers irrespective of the same or different types. Likewise, a general term of a polymer refers to a polymer prepared from only one type of a monomer and includes the term of homopolymer and the term of copolymer.

In the present disclosure, the term "iodine value" is a value representing the number of double bonds contained in a fatty acid composing an oil, and represents the number of g of iodine absorbed in 100 g of an oil.

In the present disclosure, the term "monovalent hydrocarbon group" may mean a monovalent atomic group in which carbon and hydrogen are bonded, such as a monovalent alkyl group, an alkenyl group, an alkynyl group, a cycloalkyl group, a cycloalkyl group including one or more unsaturated bonds and an aryl group, and the minimum number of carbon atoms of a substituent represented by monovalent hydrocarbon may be determined according to the type of each substituent.

In the present disclosure, the term "divalent hydrocarbon group" may mean a divalent atomic group in which carbon and hydrogen are bonded, such as a divalent alkylene group, an alkenylene group, an alkynylene group, a cycloalkylene group, a cycloalkylene group including one or more unsaturated bonds and an arylene group, and the minimum number of carbon atoms of a substituent represented by divalent hydrocarbon may be determined according to the type of each substituent.

In the present disclosure, the term "alkyl group" may mean monovalent aliphatic saturated hydrocarbon, and may include both a linear alkyl group such as methyl, ethyl, propyl and butyl and a branched alkyl group such as isopropyl, sec-butyl, tert-butyl and neo-pentyl.

In the present disclosure, the term "alkenyl group" may mean a monovalent aliphatic unsaturated hydrocarbon including one or two or more double bonds.

In the present disclosure, the term "alkynyl group" may mean a monovalent aliphatic unsaturated hydrocarbon including one or two or more triple bonds.

In the present disclosure, the term "alkylene group" may mean divalent aliphatic saturated hydrocarbon such as methylene, ethylene, propylene and butylene.

In the present disclosure, the term "aryl group" may mean aromatic hydrocarbon, and may include both monocyclic aromatic hydrocarbon in which one ring is formed, and polycyclic aromatic hydrocarbon in which two or more rings are bonded.

In the present disclosure, the term "heterocyclic group" is a cycloalkyl group or an aryl group, in which one or more carbon atoms are substituted with heteroatoms, and may include, for example, both a heterocycloalkyl group and a heteroaryl group.

In the present disclosure, the term "substituted" may mean that hydrogen of a functional group, an atomic group or a compound is substituted with a specific substituent, and if the hydrogen of a functional group, an atomic group or a compound is substituted with a specific substituent, one or a plurality including two or more substituents may be present according to the number of hydrogen present in the functional group, the atomic group or the compound, and if there are a plurality of substituents, each substituent may be the same or different.

In the present disclosure, the term "single bond" may mean a single covalent bond itself excluding a separate atomic or molecular group.

In the present disclosure, the terms "derived unit", "derived repeating unit" and "derived functional group" may represent a component or a structure comes from a certain material, or the material itself.

In the present disclosure, the term "coupling bond" may mean that a polymer chain and a derived unit from a vegetable oil make a covalent bond by the coupling reaction between a modified polymer chain and a derived unit from a vegetable oil, particularly, may mean that the active anion of a modified polymer chain and the ester of the triglyceride molecule of a vegetable oil react so that the terminal of the modified polymer chain and the derived unit from a vegetable oil make a covalent bond.

In the present disclosure, the terms "comprising", and "having" and the derivatives thereof, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

[Measurement Conditions]

In the present disclosure, "weight average molecular weight (Mw), "number average molecular weight (Mn)" and "molecular weight distribution (MWD)" were obtained by measuring a weight average molecular weight (Mw) and a number average molecular weight (Mn) through gel permeation chromatography (GPC, PL GPC220, Agilent Technologies) under the conditions below, and calculating molecular weight distribution (PDI, MWD, Mw/Mn) from the measured molecular weights.

Column: Two columns of PLgel Olexis (Polymer Laboratories Co.) and one column of PLgel mixed-C (Polymer Laboratories Co.) were used in combination Solvent: Tetrahydrofuran and 2 wt % of an amine compound were mixed and used Flow rate: 1 ml/min Specimen concentration: 1-2 mg/ml (diluted in THF)

Injection amount: 100 μl

Column temperature: 40° C.

Detector: Refractive index

Standard: Polystyrene (calibrated with a cubic function)

In the present disclosure, "glass transition temperature (Tg)" was obtained based on ISO 22768:2006 as follows: a differential scanning calorimeter (DSCQ100, TA Co.) was used, and under the circulation of nitrogen in a rate of 50 ml/min, a differential scanning calorimetry curve (DSC curve) was recorded while elevating the temperature from −100° C. in a rate of 10° C./min, and the peak top (inflection point) of a DSC differential curve was measured as the glass transition temperature.

In the present disclosure, the "Si content" was measured by an ICP analysis method using an inductively coupled plasma optical emission spectroscopy (ICP-OES; Optima 7300DV), and by using the inductively coupled plasma optical emission spectroscopy, measurement was performed by adding about 0.7 g of a specimen to a platinum (Pt) crucible, adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr), 2) step 2: initial temp 180° C., rate (temp/hr) 85° C./hr, temp (holdtime) 370° C. (2 hr), and 3) step 3: initial temp 370° C., rate (temp/hr) 47° C./hr, temp (holdtime) 510° C. (3 hr), adding 1 mL of concentrated nitric acid (48 wt %) and 20 μl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 ml ultrapure water, and performing incineration.

In the present disclosure, the "N content" may be measured through an NSX analysis method, and measurement by the NSX analysis method may use a quantitative analyzer of a trace amount of nitrogen (NSX-2100H). Particularly, the quantitative analyzer of a trace amount of nitrogen (Auto sampler, Horizontal furnace, PMT & Nitrogen detector) was turned on, carrier gas flow amounts were set to 250 ml/min for Ar, 350 ml/min for $O_2$, and 300 ml/min for ozonizer, a heater was set to 800° C., and the analyzer was stood for about 3 hours for stabilization. After stabilizing the analyzer, a calibration curve with calibration curve ranges of 5 ppm, 10 ppm, 50 ppm, 100 ppm and 500 ppm was made using Nitrogen standard (AccuStandard S-22750-01-5 ml), an area corresponding to each concentration was obtained, and then, by using the ratios of concentrations to areas, a straight line was made. After that, a ceramic boat holding 20 mg of a specimen was put in the auto sampler of the analyzer and measurement was conducted to obtain an area. By using the area of the specimen thus obtained and the calibration curve, the N content was calculated. In this case, the specimen used in the NSX analysis method may be an oil-extended modified conjugated diene-based polymer from which solvents are removed by putting the specimen in hot water heated by steam and stirring, and may be a specimen from which remaining monomer and remaining modifier are removed.

Oil-Extended Modified Conjugated Diene-Based Polymer

The present invention provides an oil-extended modified conjugated diene-based polymer having excellent tensile properties, rolling resistance, processability and abrasion resistance.

The oil-extended modified conjugated diene-based polymer according to an embodiment of the present invention is characterized in comprising a modified polymer chain comprising a repeating unit derived from a conjugated diene-based monomer and a functional group derived from an aminoalkoxysilane-based modifier, and a derived unit from a vegetable oil, wherein at least one of the modified polymer chain is coupling bonded with the derived unit from a vegetable oil, N and Si atoms are comprised in 100 ppm or more each based on a total weight of the polymer, two glass transition temperatures of Tg1 and Tg2 measured by differential scanning calorimetry (DSC) are shown, the Tg1 is from −80° C. to −20° C., the Tg2 is from −50° C. to 30° C., and the Tg2 is higher than the Tg1.

Generally, oil-extended rubber is rubber prepared by mixing synthetic rubber with petroleum-based oil to improve the flexibility, elasticity and compounding properties of synthetic rubber such as a conjugated diene-based polymer. However, the petroleum-based oil is a material which is not eco-friendly and has various environmental issues, and recently, due to the recent environmental issues, there is increasing need to develop an eco-friendly material for rubber. In addition, due to such environmental issues, technique of preparing synthetic rubber by adding natural oil instead of petroleum-based oil during compounding synthetic rubber or after finishing the polymerization or rubber, and performing a stripping process step has been tried, but in this case, there were problems in that the abrasion resistance of the synthetic rubber was improved, but fuel consumption properties were degraded, and the maintaining properties of physical properties for a long time were not good due to migration phenomenon.

However, the oil-extended modified conjugated diene-based polymer according to the present invention is prepared by mixing a polymer including a modified polymer chain with a vegetable oil, after modification reaction and before finishing polymerization activation, by using a vegetable oil derived from plants which are eco-friendly raw materials, and has a structure in which the modified polymer chain and a derived unit from the vegetable oil are coupling bonded. Accordingly, the oil-extended modified conjugated diene-based polymer is eco-friendly and has excellent tensile properties and running resistance through the reaction of a functional group derived from the modifier and a polar group of the derived unit from the vegetable oil, and also, includes the derived unit from the vegetable oil in a specific amount, and accordingly, satisfies Tg1 and Tg2, and may improve processability and abrasion resistance, simultaneously.

The oil-extended conjugated diene-based polymer according to the present invention includes a modified polymer chain including a repeating unit derived from a conjugated diene-based monomer and a functional group derived from a modifier, and here, the repeating unit derived from a conjugated diene-based monomer may mean a repeating unit formed during polymerizing a conjugated diene-based monomer, and the functional group derived from a modifier may be a unit derived from a modifier formed though the modification reaction or coupling reaction of the modifier and an active polymer.

In addition, the modified polymer chain may further include a repeating unit derived from an aromatic vinyl-based monomer, and in this case, the modified polymer chain may be a copolymer including a repeating unit derived from a conjugated diene-based monomer and a repeating unit derived from an aromatic vinyl monomer. Here, the repeating unit derived from an aromatic vinyl monomer may mean a repeating unit formed during polymerizing an aromatic vinyl-based monomer.

According to an embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

The aromatic vinyl monomer may be, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, 3-(2-pyrrolidino ethyl)styrene, 4-(2-(pyrrolidino ethyl)styrene and 3-(2-pyrrolidino-1-methyl ethyl)methylstyrene.

In another embodiment, the oil-extended modified conjugated diene-based polymer may be a copolymer further including a repeating unit derived from a diene-based monomer of 1 to 10 carbon atoms together with the repeating unit derived from the conjugated diene-based monomer. The repeating unit derived from a diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from a diene-based monomer in greater than 0 wt % to 1 wt %, greater than 0 wt % to 0.1 wt %, greater than 0 wt % to 0.01 wt %, or greater than 0 wt % to 0.001 wt %, and within this range, effects of preventing gel formation may be achieved.

According to an embodiment of the present invention, the copolymer may be a random copolymer, and in this case, effects of excellent balance among physical properties may be achieved. The random copolymer may mean repeating units forming a copolymer, arranged in disorder.

In another embodiment, the oil-extended modified conjugated diene-based polymer may include N atoms and Si atoms in 100 ppm or more each based on the total weight of the polymer, and thus, effects of excellent tensile properties and running resistance may be achieved.

Particularly, the oil-extended modified conjugated diene-based polymer may include N atoms and Si atoms each in 100 ppm to 1000 ppm, 150 ppm to 700 ppm based on the total weight of the polymer.

In the oil-extended modified conjugated diene-based polymer according to an embodiment of the present invention, the N atoms and Si atoms in the polymer are derive from a functional group derived from the modifier included in the modified polymer chain. Here, the oil-extended modified conjugated diene-based polymer is prepared by mixing the polymer including the modified polymer chain and the vegetable oil and has a structure in which at least one modified polymer chain is coupling bonded with the derived unit from the vegetable oil, as described above, and the contents of N atoms and Si atoms in the polymer mean the contents of N atoms and Si atoms in the modified polymer chain, further may represent a modification degree. If the N atoms and Si atoms in the polymer are in the content ranges, the modified polymer chain and the vegetable oil may be combined to form a short branch structure, thereby accomplishing the improving effects of processability. On the contrary, if the contents of N atoms and Si atoms are less than the lower limit of the range, the modification degree of the modified polymer chain is insignificant, and the improving effects of physical properties may be none or insignificant, and if the contents of N atoms and Si atoms are greater than the upper limit of the range, all the terminals of the modified polymer chain are modified, and the modified polymer chain capable of bonding with the vegetable oil is insufficient, the formation of the short branch may be impossible, the polymer chain and the vegetable oil are separately present in the polymer, oil migration phenomenon occurs, and improving effects of processability may not be achieved.

Meanwhile, the N atoms and Si atoms may be derived from a functional group derived from an aminoalkoxysilane-based modifier, and the aminoalkoxysilane-based modifier may be one or more selected from the compounds represented by Formula 1 to Formula 3 below.

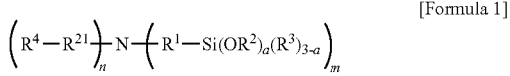
[Formula 1]

In Formula 1, $R^1$ is a single bond, or an alkylene group of 1 to 10 carbon atoms, $R^2$ and $R^3$ are each independently an alkyl group of 1 to 10 carbon atoms, $R^4$ is hydrogen, an epoxy group, an alkyl group of 1 to 10 carbon atoms, an allyl group of 2 to 10 carbon atoms, a mono-substituted, di-substituted, or tri-substituted alkylsilyl group with alkyl groups of 1 to 10 carbon atoms, or a heterocyclic group of 2 to 10 carbon atoms, $R^{21}$ is a single bond, an alkylene group of 1 to 10 carbon atoms, or —$[R^{42}O]$—, where $R^{42}$ is an alkylene group of 1 to 10 carbon atoms, j is an integer selected from 1 to 30, a and m are each independently an integer selected from 1 to 3, and n is an integer of 0 to 2.

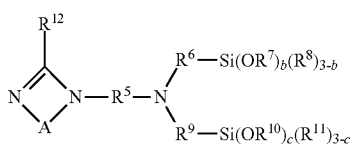
[Formula 2]

In Formula 2, $R^5$, $R^6$ and $R^9$ are each independently an alkylene group of 1 to 10 carbon atoms, $R^7$, $R^8$, $R^{10}$ and $R^{11}$ are each independently an alkyl group of 1 to 10 carbon atoms, $R^{12}$ is hydrogen or an alkyl group of 1 to 10 carbon atoms, b and c are each independently 1, 2 or 3, where b+c≥4 is satisfied, and A is

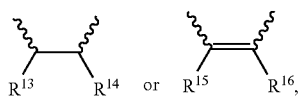

where $R^{13}$, $R^{11}$, $R^{15}$ and $R^{16}$ are each independently hydrogen or an alkyl group of 1 to 10 carbon atoms.

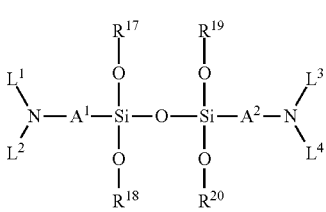
[Formula 3]

In Formula 3, $A_1$ and $A^2$ are each independently a divalent hydrocarbon group of 1 to 20 carbon atoms, which includes an oxygen atom or not, $R^{17}$ to $R^{20}$ are each independently a monovalent hydrocarbon group of 1 to 20 carbon atoms, $L^1$ to $L^4$ are each independently a mono-substituted, di-substituted, or tri-substituted alkylsilyl group with alkyl groups of 1 to 10 carbon atoms, or a monovalent hydrocarbon group of 1 to 20 carbon atoms, where $L^1$ and $L^2$, and $L^3$ and $L^4$, each are combined with each other to form rings of 1 to 5 carbon atoms, respectively, and if $L^1$ and $L^2$, and $L^3$ and $L^4$, each are combined with each other to form rings, respectively, the rings thus formed include one to three of one or more types of heteroatoms selected from the group consisting of N, O and S.

In a particular embodiment, the compound represented by Formula 1 may be one or more selected from the group consisting of N,N-bis(3-(dimethoxy(methyl)silyl)propyl)-methyl-1-amine, N,N-bis(3-(diethoxy(methyl)silyl)propyl)-methyl-1-amine, N,N-bis(3-(trimethoxysilyl)propyl)-methyl-1-amine, N,N-bis(3-(triethoxysilyl)propyl)-methyl-1-amine, tri(trimethoxysilyl)amine, tri-(3-(trimethoxysilyl)propyl)amine, N,N-bis(3-(diethoxy(methyl)silyl)propyl)-1,1,1-trimethylsilanamine, N-(3-(1H-1,2,4-triazole-1-yl)propyl)-3-(trimethoxysilyl)-N-(3-(trimethoxysilyl)propyl)propan-1-amine, 3-(trimethoxysilyl)-N-(3-(trimethoxysilyl)propyl)-N-(3-(1-(3-(trimethoxysilyl)propyl)-1H-1,2,4-triazol-3-yl)propyl)propan-1-amine, N-allyl-N-(3-(trimethoxysilyl)propyl)prop-2-enamine, N,N-bis(oxiran-2-ylmethyl)-3-(trimethoxysilyl)propan-1-amine, 1,1,1-trimethyl-N-(3-(triethoxysilyl)propyl)-N-(trimethylsilyl)silanamine and N,N-bis(3-(triethoxysilyl)propyl)-2,5,8,11,14-pentaoxahexadecan amine.

In a particular embodiment, the compound represented by Formula 2 may be one or more selected from the group consisting of N-(3-(1H-imidazol-1-yl)propyl)-3-(triethoxysilyl)-N-(3-(triethoxysilyl)propyl)propan-1-amine and 3-(4,5-dihydro-1H-imidazol-1-yl)-N,N-bis(3-(triethoxysilyl)propyl)propan-1-amine.

In a particular embodiment, the compound represented by Formula 3 may be one or more selected from the group consisting of 3,3'-(1,1,3,3-tetramethoxydisiloxane-1,3-diyl)bis(N,N-dimethylpropan-1-amine), 3,3'-(1,1,3,3-tetraethoxydisiloxane-1,3-diyl)bis(N,N-dimethylpropan-1-amine), 3,3'-(1,1,3,3-tetrapropoxydisiloxane-1,3-diyl)bis(N,N-dimethylpropan-1-amine), 3,3'-(1,1,3,3-tetramethoxydisiloxane-1,3-diyl)bis(N,N-diethylpropan-1-amine), 3,3'-(1,1,3,3-tetramethoxydisiloxane-1,3-diyl)bis(N,N-dipropylpropan-1-amine), 3,3'-(1,1,3,3-tetraethoxydisiloxane-1,3-diyl)bis(N,N-diethylpropan-1-amine), 3,3'-(1,1,3,3-tetrapropoxydisiloxane-1,3-diyl)bis(N, N-diethylpropan-1-amine), 3,3'-(1,1,3,3-tetraethoxydisiloxane-1,3-diyl)bis(N,N-dipropylpropan-1-amine), 3,3'-(1,1,3,3-tetrapropoxydisiloxane-1,3-diyl)bis(N,N-dipropylpropan amine), 3,3'-(1,1,3,3-tetramethoxydisiloxane-1,3-diyl)bis(N,N-diethylmethan-1-amine), 3,3'-(1,1,3,3-tetraethoxydisiloxane-1,3-diyl)bis(N,N-diethylmethan-1-amine), 3,3'-(1,1,3,3-tetrapropoxydisiloxane-1,3-diyl)bis(N,N-diethylmethan-1-amine), 3,3'-(1,1,3,3-tetramethoxydisiloxane-1,3-diyl)bis(N,N-dimethylmethan-1-amine), 3,3'-(1,1,3,3-tetramethoxydisiloxane-1,3-diyl)bis(N,N-dipropylmethan-1-amine), 3,3'-(1,1,3,3-tetrapropoxydisiloxane-1,3-diyl)bis(N,N-dimethylmethan-1-amine), 3,3'-(1,1,3,3-tetrapropoxydisiloxane-1,3-diyl)bis(N,N-dipropylmethan-1-amine), 3,3'-(1,1,3,3-tetraethoxydisiloxane-1,3-diyl)bis(N,N-dimethylmethan-1-amine), 3,3'-(1,1,3,3-tetraethoxydisiloxane-1,3-diyl)bis(N,N-dipropylmethan-1-amine), N,N'-((1,1,3,3-tetramethoxydisiloxane-1,3-diyl)bis(propan-3,1-diyl))bis(1,1,1-trimethyl-N-(trimethylsilyl)silanamine), N,N'-((1,1,3,3-tetraethoxydisiloxane-1,3-diyl)bis(propan-3,1-diyl))bis(1,1,1-trimethyl-N-(trimethylsilyl)silanamine), N,N'-((1,1,3,3-tetrapropoxydisiloxane-1,3-diyl)bis(propan-3,1-diyl))bis(1,1,1-trimethyl-N-(trimethylsilyl)silanamine), N,N'-((1,1,3,3-tetramethoxydisiloxane-1,3-diyl)bis(propan-3,1-diyl))bis(1,1,1-trimethyl-N-phenylsilanamine), N,N'-((1,1,3,3-tetraethoxydisiloxane-1,3-diyl)bis(propan-3,1-diyl))bis(1,1,1-trimethyl-N-phenylsilanamine), N,N'-((1,1,3,3-tetrapropoxydisiloxane-1,3-diyl)bis(propan-3,1-diyl))bis(1,1,1-trimethyl-N-phenylsilanamine), 1,3-bis(3-(1H-imidazol-1-yl)propyl)-1,1,3,3-tetramethoxydisiloxane, 1,3-bis(3-(1H-imidazol-1-yl)propyl)-1,1,3,3-tetraethoxydisiloxane, and 1,3-bis(3-(1H-imidazol-1-yl)propyl)-1,1,3,3-tetrapropoxydisiloxane.

In another embodiment, the oil-extended modified conjugated diene-based polymer has two glass transition temperatures of Tg1 and Tg2. In this case, Tg1 may be −80° C. to −20° C., Tg2 may be −50° C. to 30° C., and Tg2 may be higher than Tg1.

Meanwhile, the glass transition temperature is a value changing according to the microstructure of a polymer and the content of the derived unit from a vegetable oil in a polymer, but in order to achieve excellent abrasion resistance and processability of a polymer in balance, simultaneously, the polymer is preferably prepared to satisfy the range, particularly, Tg1 may be −60° C. to −30° C., Tg2 may be −40° C. to 20° C., and Tg2 may be higher than Tg1.

The glass transition temperature may be flexibly controlled according to the bonding method of a conjugated diene-based monomer (1,2-bond or 1,4-bond), the presence or absence of a repeating unit derived from an aromatic vinyl-based monomer, and the content of a repeating unit derived from an aromatic vinyl-based monomer, in a polymer unit, and a microstructure (1,2-vinyl bond content and styrene bond content) in each unit according to polymerization method and polymerization conditions.

For example, the oil-extended modified conjugated diene-based polymer may include the repeating unit derived from an aromatic vinyl-based monomer in 0 wt % to 50 wt %, particularly, 0 wt % to 45 wt %, preferably, greater than 0 wt % to 40 wt %, and here, the inclusion of the repeating unit derived from an aromatic vinyl-based monomer in 0 wt % means that the repeating unit derived from an aromatic vinyl-based monomer is not included, and the polymer is composed of only a conjugated diene-based monomer.

In addition, the vegetable oil may have a density of less than 1.0 g/cm³, and in a more preferred aspect considering the dielectricity and elasticity of the oil-extended modified conjugated diene-based polymer, the density of the vegetable oil may be 0.90 g/cm³ to 0.95 g/cm³.

Meanwhile, in the present invention, the "vegetable oil" is an oil component derived, i.e., extracted from plants, and is generally a triglyceride molecule represented by Formula 4 below.

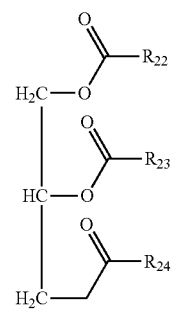

[Formula 4]

In Formula 4, each of $R_{22}$ to $R_{24}$ is the radical of an ester derived from a fatty acid, and is a unsaturated or saturated hydrocarbon group.

Here, the relative ratio of $R_{22}$ to $R_{24}$ may be different according to the type of the vegetable oil, for example, as follows shown in Table 1 below.

TABLE 1

| Vegetable oil | Saturated (wt %, $R_{22}$) | Monounsaturated (wt %, $R_{23}$) | Polyunsaturated (wt %, $R_{24}$) |
| --- | --- | --- | --- |
| Soybean oil | 17 | 23 | 60 |
| Sunflower oil | 10 | 45 | 40 |
| Canola oil | 7 | 63 | 28 |
| Linseed oil | 10 | 45 | 40 |
| Olive oil | 14 | 73 | 11 |
| Peanut oil | 17 | 46 | 32 |
| Cottonseed oil | 26 | 18 | 52 |
| Oil palm oil | 49 | 37 | 9 |
| Olive oil | 14 | 73 | 11 |

In another embodiment, the vegetable oil may have an iodine value of 70 to 150, particularly, 110 to 140. In addition, the vegetable oil may have a glass transition temperature of −110° C. to −100° C., and within this range, the abrasion resistance of a rubber composition may be improved even more.

In another embodiment, as the vegetable oil, oils derived from plants may be included in the present invention without specific limitation, and particularly, the vegetable oil may be one or more selected from the group consisting of soybean oil, rapeseed oil, canola oil, sunflower oil, linseed oil, rice bran oil, palm oil, olive oil, peanut oil, oil palm oil, cottonseed oil, and coconut oil. More particularly, in respect of achieving the desired effects more favorably, the vegetable oil may be soybean oil.

In addition, the oil-extended modified conjugated diene-based polymer may include a derived unit from the vegetable oil in 20 parts by weight to 60 parts by weight, or 20 parts by weight to 37.5 parts by weight based on 100 parts by weight of the polymer. In this case, the glass transition temperature of the oil-extended modified conjugated diene-based polymer may satisfy the aforementioned range more flexibly, and at the same time, effects of even better flexibility, elasticity and abrasion resistance of the polymer may be achieved.

Meanwhile, the oil-extended modified conjugated diene-based polymer according to an embodiment of the present invention may have molecular weight distribution of 1.0 to 2.0.

In addition, the oil-extended modified conjugated diene-based polymer may have a number average molecular weight (Mn) of 1,000 g/mol to 2,000,000 g/mol, 10,000 g/mol to 1,000,000 g/mol, or 100,000 g/mol to 800,000 g/mol, a weight average molecular weight (Mw) of 1,000 g/mol to 3,000,000 g/mol, 10,000 g/mol to 2,000,000 g/mol, or 100,000 g/mol to 2,000,000 g/mol, and within these ranges, excellent effects of rolling resistance and wet skid resistance may be achieved.

In addition, the oil-extended modified conjugated diene-based polymer may have mooney viscosity at 140° C. of 30 or more, 40 to 150, or 40 to 140, and within this range, excellent effects or processability and productivity may be achieved.

In addition, the oil-extended modified conjugated diene-based polymer may have the vinyl content of 5 wt % or more, 10 wt % or more, or 10 wt % to 60 wt %. Here, the vinyl content may mean the content of a not 1,4-added but 1,2-added conjugated diene-based monomer based on 100 wt % of a conjugated diene-based copolymer composed of a monomer having a vinyl group and an aromatic vinyl-based monomer.

Preparation Method of Oil-Extended Modified Conjugated Diene-Based Polymer

In addition, the present invention provides a method for preparing the oil-extended modified conjugated diene-based polymer.

The method for preparing the oil-extended modified conjugated diene-based polymer according to the present invention may include a step of polymerizing a conjugated diene-based monomer, or a conjugated diene-based monomer and an aromatic vinyl-based monomer, in the presence of a polymerization initiator in a hydrocarbon solvent to prepare an active polymer (S1); a step of reacting or coupling the active polymer with an aminoalkoxysilane-based modifier to prepare a modified polymer (S2); and a step of mixing the modified polymer with a vegetable oil.

Here, the conjugated diene-based monomer, the aromatic vinyl-based monomer, the modifier and the vegetable oil, used in the preparation method are the same as described above, and particular description thereon will be omitted.

The hydrocarbon solvent is not specifically limited, but may be, for example, one or more selected from the group consisting of n-pentane, n-hexane, n-heptane, isooctane, cyclohexane, toluene, benzene and xylene.

According to an embodiment of the present invention, the polymerization initiator may be used in 0.01 mmol to 10 mmol, 0.05 mmol to 5 mmol, 0.1 mmol to 2 mmol, 0.1 mmol to 1 mmol, or 0.15 to 0.8 mmol based on total 100 g of the monomer. In addition, the polymerization initiator is not specifically limited but may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

Step (S1)

The polymerization of step (S1) may be, for example, anionic polymerization, particularly, living anionic polymerization by which an anionic active part is formed at the polymerization terminal through a propagation reaction by anions. In addition, the polymerization of step (S1) may be a polymerization with heating, an isothermal polymerization, or a polymerization at a constant temperature (adiabatic polymerization). The polymerization at a constant temperature may mean a polymerization method including a step of polymerizing using self-generated heat of reaction without optionally applying heat after adding a polymerization initiator, the polymerization with heating may mean a polymerization method including injecting the polymerization initiator and then, increasing the temperature by optionally applying heat, and the isothermal polymerization may mean a polymerization method by which the temperature of a polymer is kept constant by increasing heat by applying heat or taking heat after injecting the polymerization initiator.

In addition, according to an embodiment of the present invention, the polymerization of step (S1) may be performed by further adding a diene-based compound of 1 to 10 carbon atoms in addition to the conjugated diene-based monomer, and in this case, effects of preventing the formation of gel on the wall of a reactor during operation for a long time may be achieved. The diene-based compound may be, for example, 1,2-butadiene.

The polymerization in step (S1) may be performed, for example, in a temperature range of 80° C. or less, −20° C. to 80° C., 0° C. to 80° C., 0° C. to 70° C. or 10° C. to 70° C., and within this range, the molecular weight distribution of the polymer may be controlled narrow, and excellent effects of improving physical properties may be achieved.

The active polymer prepared by step (S1) may mean a polymer in which a polymer anion and an organometallic cation are combined.

Meanwhile, the polymerization in step (S1) may be performed by adding a polar additive, and the polar additive may be added in a ratio of 0.001 g to 50 g, or 0.001 g to 10 g, or 0.005 g to 0.1 g based on total 100 g of the monomer. In another embodiment, the polar additive may be added in a ratio of 0.001 g to 10 g, 0.005 g to 5 g, 0.005 g to 4 g based on total 1 mmol of a modification initiator.

The polar additive may be, for example, one or more selected from the group consisting of tetrahydrofuran, 2,2-di(2-tetrahydrofuryl)propane, diethyl ether, cycloamyl ether, dipropyl ether, ethylene methyl ether, ethylene dimethyl ether, diethyl glycol, dimethyl ether, tert-butoxy ethoxy ethane, bis(3-dimethylaminoethyl)ether, (dimethylaminoethyl) ethyl ether, trimethylamine, triethylamine, tripropylamine, N,N,N',N'-tetramethylethylenediamine, sodium mentholate and 2-ethyl tetrahydrofurfuryl ether, and may particularly be triethylamine, tetramethyleneethylenediamine, sodium mentholate or 2-ethyl tetrahydrofurfuryl ether. If the polar additive is included during copolymerizing a conjugated diene-based monomer, or a conjugated diene-based monomer and an aromatic vinyl-based monomer, the reaction rate difference thereof may be compensated, and inducing effects of easy formation of a random copolymer may be achieved.

Step (S2)

Step (S2) is a step for preparing a modified polymer and may be performed through modification reaction or coupling of an active polymer with a modifier.

The modifier may be used in an amount of 0.01 mmol to 10 mmol based on total 100 g of the monomer. In another embodiment, the modifier may be used in a molar ratio of 1:0.1 to 10, 1:0.1 to 5, or 1:0.1 to 1:3, based on 1 mol of the polymerization initiator in step (S1).

Step (S3)

Step (S3) is a step for preparing an oil-extended modified conjugated diene-based polymer and may be performed by mixing the modified polymer with a vegetable oil, and particularly, the vegetable oil may be used in 10 parts by weight to 60 parts by weight, particularly, 20 parts by weight to 37.5 parts by weight based on 100 parts by weight of the modified polymer.

In this case, the vegetable oil may be added to a polymer after modification reaction and prior to finishing polymerization activation by adding a polymerization terminator, so as to react with the modified polymer.

Rubber Composition

Also, the present invention provides a rubber composition including the oil-extended modified conjugated diene-based polymer.

The rubber composition may include the oil-extended modified conjugated diene-based polymer in an amount of 10 wt % or more, 10 wt % to 100 wt %, or 20 wt % to 90 wt %, and within this range, mechanical properties such as tensile strength and abrasion resistance are excellent, and effects of excellent balance among physical properties may be achieved.

In addition, the rubber composition may further include other rubber components as necessary in addition to the oil-extended modified conjugated diene-based polymer, and in this case, the rubber components may be included in an amount of 90 wt % or less based on the total weight of the rubber composition. In a particular embodiment, the other rubber components may be included in an amount of 1 part by weight to 900 parts by weight based on 100 parts by weight of the oil-extended modified conjugated diene-based polymer.

The rubber component may be, for example, natural rubber or synthetic rubber, and may particularly be natural rubber (NR) including cis-1,4-polyisoprene; modified natural rubber which is obtained by modifying or purifying common natural rubber, such as epoxidized natural rubber (ENR), deproteinized natural rubber (DPNR), and hydrogenated natural rubber; and synthetic rubber such as a styrene-butadiene copolymer (SBR), a polybutadiene (BR), a polyisoprene (IR), butyl rubber (IIR), an ethylene-propylene copolymer, a polyisobutylene-co-isoprene, neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), polysulfide rubber, acryl rubber, urethane rubber, silicone rubber, epichlorohydrin rubber, and halogenated butyl rubber, and any one or a mixture of two or more thereof may be used.

The rubber composition may include a filler in 0.1 parts by weight to 200 parts by weight, or 10 parts by weight to 120 parts by weight based on 100 parts by weight of the oil-extended modified conjugated diene-based polymer of the present invention. The filler may be, for example, a silica-based filler, particularly, wet silica (hydrated silicate), dry silica (anhydrous silicate), calcium silicate, aluminum silicate, colloid silica, etc., and preferably, the filler may be wet silica which has the most significant improving effect of destruction characteristics and compatible effect of wet grip. In addition, the rubber composition may further include a carbon-based filler, if needed.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. Preferably, bis(3-triethoxysilylpropyl)polysulfide or 3-trimethoxysilylpropylbenzothiazyltetrasulfide may be used in consideration of the improving effect of reinforcing properties.

In addition, in the rubber composition according to an embodiment of the present invention, since an oil-extended modified conjugated diene-based polymer in which a functional group having high affinity with silica is brought in an active part is used as a rubber component, the mixing amount of the silane coupling agent may be smaller than a common case. Thus, the silane coupling agent may be used in an amount of 1 part by weight to 20 parts by weight, or 5 parts by weight to 15 parts by weight based on 100 parts by weight of silica, and within the above amount range, effects as a coupling agent may be sufficiently shown, and effects of preventing gelation of a rubber component may be achieved.

The rubber composition according to an embodiment of the present invention may be sulfur crosslinkable, and may further include a vulcanizing agent. The vulcanizing agent may particularly be a sulfur powder and may be included in an amount of 0.1 parts by weight to 10 parts by weight based on 100 parts by weight of a rubber component, and within the above amount range, elasticity and strength required for a vulcanized rubber composition may be confirmed, and at the same time, an excellent low fuel consumption ratio may be achieved.

The rubber composition according to an embodiment of the present invention may further include various additives used in a common rubber industry in addition to the above components, particularly, a vulcanization accelerator, a process oil, an antioxidant, a plasticizer, an antiaging agent, a scorch preventing agent, a zinc white, a stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may include, for example, paraffin-based, naphthene-based, or aromatic compounds. The aromatic process oil may be used in consideration of tensile strength and abrasion resistance, and the naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antioxidant may include, for example, 2,6-di-t-butyl para cresol, dibutylhydroxytoluenyl, 2,6-bis((dodecylthio) methyl)-4-nonylphenol or 2-methyl-4,6-bis((octylthio) methyl)phenol, in 0.1 parts by weight to 6 parts by weight based on 100 parts by weight of the rubber component.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mixing using a mixing apparatus such as a banbury mixer, a roll, and an internal mixer according to a mixing prescription, and a rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may be a tire or include a tire tread.

EXAMPLES

Hereinafter, the present invention will be explained in more detail referring to embodiments. Embodiments according to the present invention may be modified into various other types, and the scope of the present invention should not be limited to the embodiments described below. The embodiments of the present invention are provided for completely explaining the present invention to a person having an average knowledge in the art.

Example 1

To a 20 L, autoclave reactor, 4,242 g of n-hexane, 212.5 g of styrene, 605.6 g of 1,3-butadiene and 1.02 g of N,N,N',N'-tetramethyl ethylenediamine (TMEDA) as a polar additive were added, 2.7 g of n-butyllithium (10 wt % in n-hexane) was injected, the internal temperature of the reactor was adjusted to 40° C., and adiabatic heating reaction was performed. After the lapse of about 30 minutes, 31.9 g of 1,3-butadiene was injected for capping the terminal of a polymer with butadiene. N,N-bis(3-(dimethoxy(methyl)silyl)propyl)-methyl-1-amine was injected thereto as a modifier and reacted to prepare a modified polymer ([TMEDA]:[act. Li]=4.1:1 molar ratio, [modifier]:[act. Li]=0.40:1 molar ratio). Then, 276.3 g of soybean oil (density of 0.925 g/cm$^3$) was injected and mixed. The reaction was quenched using ethanol, and 14 g of a hexane solution in which 30 wt % of Wingstay K was dissolved as an antioxidant in hexane was added. The polymer thus obtained was put in hot water heated with steam and stirred to remove solvents. Then, remaining solvents and water were removed by roll drying to prepare an oil-extended modified styrene-butadiene copolymer.

Example 2

An oil-extended modified styrene-butadiene copolymer was prepared by performing the same method as in Example 1 except for using 3-(4,5-dihydro-1H-imidazole-1-yl)-N,N-bis(3-(triethoxysilyl)propyl)propan-1-amine instead of N,N-bis(3-(dimethoxy(methyl)silyl)propyl)-methyl-1-amine as the modifier, in Example 1 ([TMEDA]:[act. Li]=4.1:1 molar ratio, [modifier]:[act. Li]=0.30:1 molar ratio).

Example 3

An oil-extended modified styrene-butadiene copolymer was prepared by performing the same method as in Example 1 except for using 3,3'-(1,1,3,3-tetramethoxydisiloxane-1,3-diyl)bis(N,N-diethylpropan-1-amine) instead of N,N-bis(3-(dimethoxy(methyl)silyl)propyl)-methyl-1-amine as the modifier, in Example 1 ([TMEDA]:[act. Li]=4.1:1 molar ratio, [modifier]:[act. Li]=0.30:1 molar ratio).

Example 4

An oil-extended modified styrene-butadiene copolymer was prepared by performing the same method as in Example 1 except for using 3,3'-(1,1,3,3-tetraethoxydisiloxane-1,3-diyl)bis(N,N-diethylpropan-1-amine) instead of N,N-bis(3-(dimethoxy(methyl)silyl)propyl)-methyl-1-amine as the modifier, in Example 1 ([TMEDA]:[act. Li]=4.1:1 molar ratio, [modifier]:[act. Li]=0.30:1 molar ratio).

Example 5

An oil-extended modified styrene-butadiene copolymer was prepared by performing the same method as in Example 1 except for using N-(3-(1H-imidazole-1-yl)propyl)-3-(triethoxysilyl)-N-(3-(triethoxysilyl)propyl)propane-1-amine instead of N,N-bis(3-(dimethoxy(methyl)silyl)propyl)-methyl-1-amine as the modifier, in Example 1 ([TMEDA]:[act. Li]=4.1:1 molar ratio, [modifier]:[act. Li]=0.30:1 molar ratio).

Example 6

An oil-extended modified styrene-butadiene copolymer was prepared by performing the same method as in Example 1 except for injecting 318.8 g of soybean oil and mixing, in Example 1.

Example 7

An oil-extended modified styrene-butadiene copolymer was prepared by performing the same method as in Example 1 except for injecting 212.5 g of soybean oil and mixing, in Example 1.

Example 8

To a 20 L, autoclave reactor, 4,242 g of n-hexane, 318.8 g of styrene, 504.7 g of 1,3-butadiene and 0.77 g of N,N,N',N'-tetramethyl ethylenediamine (TMEDA) as a polar additive were injected, 2.7 g of n-butyllithium (10 wt % in n-hexane) was injected, the internal temperature of the reactor was adjusted to 40° C., and adiabatic heating reaction was performed. After the lapse of about 30 minutes, 26.6 g of 1,3-butadiene was injected for capping the terminal of a polymer with butadiene. 3-(dimethoxy(methyl)silyl)-N-(3-(dimethoxy(methyl)silyl)propyl)-N-methylpropan-1-amine was injected thereto as a modifier and reacted to prepare a modified polymer ([TMEDA]:[act. Li]=3.1:1 molar ratio, [modifier]:[act. Li]=0.40:1 molar ratio). Then, 276.3 g of cottonseed oil (density of 0.93 g/cm$^3$) was injected and mixed. The reaction was quenched using ethanol, and 14 g of a solution in which 30 wt % of Wingstay K was dissolved in hexane as an antioxidant was added. The polymer thus obtained was put in hot water heated with steam and stirred to remove solvents. Then, remaining solvents and water were removed by roll drying to prepare an oil-extended modified styrene-butadiene copolymer.

Comparative Example 1

An oil-extended unmodified styrene-butadiene copolymer was prepared by performing the same method as in Example 1 except for using tin chloride (SnCl$_4$) instead of 3-(dimethoxy(methyl) (silyl)-N-(3-(dimethoxy(methyl)silyl)propyl)-N-methylpropan-1-amine, in Example 1 ([TMEDA]:[act. Li]=4.1:1 molar ratio, [modifier]:[act. Li]=0.48:1 molar ratio).

Comparative Example 2

An oil-extended unmodified styrene-butadiene copolymer was prepared by performing the same method as in Example 1 except for injecting 2.0 g of n-butyllithium (10 wt % in n-hexane) and not performing the injection of a modifier and subjecting to reaction, in Example 1 ([TMEDA]:[act. Li]=5.5:1 molar ratio).

Comparative Example 3

An oil-extended unmodified styrene-butadiene copolymer was prepared by performing the same method as in Comparative Example 2 except for injecting and mixing a process oil (TDAE) instead of soybean oil, in Comparative Example 2.

Comparative Example 4

An oil-extended modified styrene-butadiene copolymer was prepared by performing the same method as in Example 1 except for injecting and mixing a process oil (TDAE) instead of soybean oil, in Example 1.

Comparative Example 5

An oil-extended modified styrene-butadiene copolymer was prepared by performing the same method as in Example 1 except for adding the soybean oil after quenching the reaction using ethanol and adding an antioxidant, and then mixing, in Example 1.

Comparative Example 6

An oil-extended modified styrene-butadiene copolymer was prepared by performing the same method as in Example 1 except for injecting and mixing 127.5 g of soybean oil, in Example 1.

Comparative Example 7

To a 20 L, autoclave reactor, 4,242 g of n-hexane, 212.5 g of styrene, 605.6 g of 1,3-butadiene and 1.02 g of N,N,N',N'-tetramethyl ethylenediamine (TMEDA) as a polar additive were added, 2.7 g of n-butyllithium (10 wt % in n-hexane) was injected, the internal temperature of the reactor was adjusted to 40° C., and adiabatic heating reaction was performed. After the lapse of about 30 minutes, 31.9 g of 1,3-butadiene was injected for capping the terminal of a polymer with butadiene. N,N-bis(3-(dimethoxy(methyl)silyl)propyl)-methyl-1-amine was injected thereto as a modifier and reacted to prepare a modified polymer ([TMEDA]:[act. Li]=4.1:1 molar ratio, [modifier]:[act. Li]=0.40:1 molar ratio). Then, the reaction was quenched using ethanol, and 14 g of a solution in which 30 wt % of Wingstay K was dissolved in hexane as an antioxidant was added. The polymer thus obtained was put in hot water heated with steam and stirred to remove solvents. Then, remaining solvents and water were removed by roll drying to prepare a modified styrene-butadiene copolymer.

Comparative Example 8

An oil-extended modified styrene-butadiene copolymer was prepared by performing the same method as in Example 1 except for using tetraethyl silicate (TEOS) instead of N,N-bis(3-(dimethoxy(methyl)silyl)propyl)-methyl-1-amine as the modifier, in Example 1 ([TMEDA]:[act. Li]=4.1:1 molar ratio, [modifier]:[act. Li]=0.13:1 molar ratio).

Experimental Example 1

The weight average molecular weight, number average molecular weight, molecular weight distribution, styrene unit and vinyl contents, N and Si atom contents, glass transition temperature, and mooney viscosity of the polymers prepared in the Examples and Comparative Examples were measured. The results are shown in Table 2 below.

1) Styrene Unit and Vinyl Contents (Wt %)

The styrene unit (SM) and vinyl contents in each polymer were measured and analyzed using Varian VNMRS 500 MHz NMR.

When measuring NMR, 1,1,2,2-tetrachloroethane was used as a solvent, and styrene unit and vinyl contents were calculated by calculating a solvent peak as 5.97 ppm, and regarding 7.2-6.9 ppm as random styrene peaks, 6.9-6.2 ppm as block styrene peaks, 5.8-5.1 ppm as 1,4-vinyl and 1,2-vinyl peaks, and 5.1-4.5 ppm as 1,2-vinyl peaks.

2) Weight Average Molecular Weight (Mw, ×10$^3$ g/Mol), Number Average Molecular Weight (Mn, ×10$^3$ g/Mol) and Molecular Weight Distribution (PDI, MWD)

By gel permeation chromatography (GPC) (PL GPC220, Agilent Technologies), the weight average molecular weight (Mw) and the number average molecular weight (Mn) were measured under the conditions below, and molecular weight distribution (PDI, MWD, Mw/Mn) was obtained by calculating from the molecular weights thus measured.

Column: Two columns of PLgel Olexis (Polymer Laboratories Co.) and one column of PLgel mixed-C (Polymer Laboratories Co.) were used in combination
Solvent: Tetrahydrofuran and 2 wt % of an amine compound were mixed and used
Flow rate: 1 ml/min
Specimen concentration: 1-2 mg/ml (diluted in THF)
Injection amount: 100 μl Column temperature: 40° C.
Detector: Refractive index
Standard: Polystyrene (calibrated by cubic function)
3) Mooney Viscosity The mooney viscosity (MV, (ML1+4, @140° C.) MU) was measured by using MV-2000 (Alpha Technologies Co.) using Large Rotor at a rotor speed of 2±0.02 rpm at 140° C. In this case, a specimen used was stood at room temperature (23±3° C.) for 30 minutes or more, and 27±3 g of the specimen was collected and put in a die cavity, and then, Platen was operated for 4 minutes for measurement.
4) N Content The N content was measured through an NSX analysis method using a quantitative analyzer of a trace amount of nitrogen (NSX-2100H).

The quantitative analyzer of a trace amount of nitrogen (Auto sampler, Horizontal furnace, PMT & Nitrogen detector) was turned on, carrier gas flow amounts were set to 250 ml/min for Ar, 350 ml/min for $O_2$, and 300 ml/min for ozonizer, a heater was set to 800° C., and the analyzer was stood for about 3 hours for stabilization. After stabilizing the analyzer, a calibration curve of calibration curve ranges of 5 ppm, 10 ppm, 50 ppm, 100 ppm and 500 ppm was made using Nitrogen standard (AccuStandard S-22750-01-5 ml), and an area corresponding to each concentration was obtained. Then, by using the ratios of concentrations to areas, a straight line was made. After that, a ceramic boat holding 20 mg of a specimen was put in the auto sampler of the analyzer and measurement was conducted to obtain an area. By using the area of the specimen thus obtained and the calibration curve, the nitrogen atom content was calculated. In this case, the specimen used in the NSX analysis method was an oil-extended modified conjugated diene-based polymer specimen from which solvents were removed by putting in hot water heated with steam, and may be a specimen from which a residual monomer and residual modifier were removed.

5) Si Content

The Si content was measured using an inductively coupled plasma optical emission spectroscopy (ICP-OES; Optima 7300DV).

Measurement was performed using the inductively coupled plasma optical emission spectroscopy by adding about 0.7 g of a specimen to a platinum (Pt) crucible and adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr)
2) step 2: initial temp 180° C., rate (temp/hr) 85° C./hr, temp (holdtime) 370° C. (2 hr)
3) step 3: initial temp 370° C., rate (temp/hr) 47° C./hr, temp (holdtime) 510° C. (3 hr), adding 1 mL of concentrated nitric acid (48 wt %) and 20 µl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 mL of ultrapure water, and performing incineration.

6) Glass Transition Temperature (Tg, ° C.)

By using a differential scanning calorimetry (DSCQ100, TA Co.) based on ISO 22768:2006, a differential scanning calorimetry curve (DSC curve) was recorded while elevating the temperature from −100° C. in a rate of 10° C./min under a nitrogen stream of 50 ml/min, and the first peak top (inflection point) of a DSC differential curve was regarded as Tg1, and the second peak top was regarded as Tg2.

TABLE 2

| Division | | Example | | | | | | | |
|---|---|---|---|---|---|---|---|---|---|
| | | 1 | 2 | 3 | 4 | 5 | 6 | 7 | 8 |
| Oil injection amount (parts by weight) | Vegetable oil | 32.5 | 32.5 | 32.5 | 32.5 | 32.5 | 37.5 | 25.0 | 32.5 |
| | Process oil | — | — | — | — | — | — | — | — |
| NMR (wt %) | SM | 25 | 25 | 26 | 25 | 26 | 25 | 25 | 36 |
| | Vinyl | 50 | 51 | 50 | 50 | 49 | 51 | 50 | 26 |
| GPC | Mw ($\times 10^4$, g/mol) | 105 | 110 | 109 | 109 | 122 | 102 | 110 | 101 |
| | Mn ($\times 10^4$, g/mol) | 58 | 62 | 62 | 59 | 65 | 57 | 61 | 57 |
| | PDI | 1.81 | 1.77 | 1.76 | 1.85 | 1.88 | 1.79 | 1.80 | 1.78 |
| Glass transition temperature (° C.) | Tg1 | −47.5 | −48.2 | −47.1 | −46.3 | −48.6 | −50.5 | −47.8 | −54.9 |
| | Tg2 | −30.1 | −29.4 | −29.5 | −28.5 | −30.5 | −32.1 | −21.1 | −35.7 |
| Mooney viscosity | | 106 | 109 | 108 | 110 | 114 | 105 | 118 | 105 |
| Si content (ppm) | | 466 | 341 | 330 | 320 | 362 | 442 | 431 | 425 |

| Division | | Comparative Example | | | | | | | |
|---|---|---|---|---|---|---|---|---|---|
| | | 1 | 2 | 3 | 4 | 5 | 6 | 7 | 8 |
| Oil injection amount (parts by weight) | Vegetable oil | 32.5 | 32.5 | — | — | 32.5 | 15.0 | — | 32.5 |
| | Process oil | — | — | 32.5 | 32.5 | — | — | — | — |
| NMR (wt %) | SM | 26 | 24 | 25 | 25 | 25 | 26 | 24 | 258 |
| | Vinyl | 50 | 51 | 50 | 50 | 49 | 48 | 51 | 50 |
| GPC | Mw ($\times 10^4$, g/mol) | 110 | 115 | 116 | 101 | 109 | 106 | 95 | 86 |
| | Mn ($\times 10^4$, g/mol) | 52 | 53 | 53 | 56 | 58 | 60 | 57 | 45 |
| | PDI | 2.12 | 2.17 | 2.19 | 1.80 | 1.88 | 1.76 | 1.66 | 1.91 |
| Glass transition temperature (° C.) | Tg1 | −46.5 | −48.1 | −21.5 | −21.5 | −47.6 | −37.3 | −22.3 | −27.8 |
| | Tg2 | −28.1 | −30.5 | — | — | −29.5 | — | — | −27.8 |
| Mooney viscosity | | 107 | 110 | 111 | 104 | 106 | 108 | 101 | 95 |
| Si content (ppm) | | — | — | — | — | 430 | 448 | 453 | 79 |

In Table 2 above, the oil injection amount is shown based on 100 parts by weight of the modified polymer.

Through Table 2, it was confirmed that the oil-extended styrene-butadiene copolymers of Example 1 to Example 8 include N and Si atoms each in 100 ppm or more based on the total weight of the polymer, and have two glass transition temperatures of Tg1 between −80° C. to −20° C. and Tg2 between −50° C. to 30° C., measured by a differential scanning calorimetry measurement method.

Experimental Example 2

In order to comparatively analyze the physical properties of rubber compositions including the copolymers of the Examples and Comparative Examples, and molded articles manufactured therefrom, abrasion resistance and processability properties were measured, and the results are shown in Table 5 below.

1) Preparation of Rubber Specimens of Examples 1 to 6, Comparative Examples 1 to 6 and Comparative Example 8

Compounding was performed using the copolymers of the Examples and Comparative Examples as raw rubber materials of rubber under the compounding conditions shown in Table 3 below. The raw materials in Table 3 are represented by parts by weight based on 100 parts by weight of the raw rubber material.

TABLE 3

| Division | Raw material | Amount (parts by weight) |
|---|---|---|
| First stage mixing | Rubber | 100 |
| | Silica | 70 |
| | Coupling agent (X50S) | 11.2 |
| | Process oil | X |
| | Zinc white | 3 |
| | Stearic acid | 2 |
| | Antioxidant | 2 |
| | Antiaging agent | 2 |
| | wax | 1 |
| Second stage mixing | Sulfur | 1.5 |
| | Rubber accelerator | 1.75 |
| | Vulcanization accelerator | 2 |

The amount X of the process oil was controlled so that the sum of the oil injection amount during preparing a polymer and the process oil injected during a first stage mixing became 37.5 parts by weight. Particularly, X was calculated by [X=37.5−oil injection amount of Table 2 (parts by weight)] and controlled, and for example, in the case of Example 1, 5 parts by weight of a process oil obtained by 37.5−32.5 (oil injection amount of Table 2) were injected.

Particularly, the rubber specimen was mixed via a first stage mixing and a second stage mixing. In the first stage mixing, a raw material rubber, silica (filler), an organic silane coupling agent (X50S, Evonik), a process oil (TDAE oil), zinc oxide (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystalline Wax) were mixed using a banbury mixer equipped with a temperature controlling apparatus. In this case, the initial temperature of a mixing apparatus was controlled to 70° C., and after finishing compounding, a first compound mixture was obtained at a discharge temperature of 145° C. In the second stage mixing, the first compound mixture was cooled to room temperature, and the first compound mixture, sulfur, a rubber accelerator (DPD (diphenylguanine)), and a vulcanization accelerator (CZ (N-cyclohexyl-2-benzothiazylsulfenamide)) were added to the mixing apparatus and mixed at a temperature of 100° C. or less to obtain a second compound mixture. Then, via a curing process at 160° C. for 20 minutes, a rubber specimen was formed.

2) Preparation of Rubber Specimen of Comparative Example 7

Compounding was performed using a modified styrene-butadiene copolymer as a raw rubber material under the compounding conditions shown in Table 4 below. The raw materials in Table 4 represent parts by weight based on 100 parts by weight of the raw rubber material.

TABLE 4

| Division | Raw material | Amount (parts by weight) |
|---|---|---|
| First stage mixing | Rubber | 100 |
| | Silica | 70 |
| | Coupling agent (X50S) | 11.2 |
| | Soybean oil | 37.5 |
| | Zinc white | 3 |
| | Stearic acid | 2 |
| | Antioxidant | 2 |
| | Antiaging agent | 2 |
| | wax | 1 |
| Second stage mixing | Sulfur | 1.5 |
| | Rubber accelerator | 1.75 |
| | Vulcanization accelerator | 2 |

Particularly, the rubber specimen was mixed via a first stage mixing and a second stage mixing. In the first stage mixing, a raw material rubber, silica (filler), an organic silane coupling agent (X50S, Evonik), soybean oil, zinc oxide (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystalline Wax) were mixed using a banbury mixer equipped with a temperature controlling apparatus. In this case, the initial temperature of a mixing apparatus was controlled to 70° C., and after finishing compounding, a first compound mixture was obtained at a discharge temperature of 145° C. In the second stage mixing, the first compound mixture was cooled to room temperature, and the first compound mixture, sulfur, a rubber accelerator (DPD (diphenylguanine)), and a vulcanization accelerator (CZ (N-cyclohexyl benzothiazylsulfenamide)) were added to the mixing apparatus and mixed at a temperature of 100° C. or less to obtain a second compound mixture. Then, via a curing process at 160° C. for 20 minutes, a rubber specimen was formed.

3) Tensile Properties

The tensile properties were measured by manufacturing each specimen and measuring tensile stress when stretched by 300% (300% modulus), strength when broken (tensile strength) and tensile rate of the specimen according to an ASTM 412 tensile test method. Particularly, tensile properties were measured using a Universal Test Machin 4204 tensile tester (Instron Co.) in a rate of 50 cm/min at room temperature. The resultant values in Table 5 are shown by index (%) based on the resultant values of Comparative Example 3, and the higher numerical value represents the better results.

4) Abrasion Resistance

For each rubber specimen, a DIN abrasion test was performed according to ASTM D5963, and a DIN loss index(loss volume index): ARIA (abrasion resistance index, Method A) was shown based on the measurement value of Comparative Example 5. The resultant values in Table 5 are shown by index (%) based on the resultant values of Comparative Example 3, and the higher numerical value represents the better results.

5) Viscoelasticity Properties

The viscoelasticity properties were verified by measuring viscoelasticity behavior on thermodynamic deformation at each measurement temperature (−60° C.~70° C.) with a frequency of 10 Hz by using a dynamic mechanical analyzer (GABO Co.) in a film tension mode and confirming a tan δ value. In the measurement resultant values, if the tan δ value at a low temperature of 0° C. increases, wet skid resistance becomes better, and if the tan δ value at a high temperature of 70° C. increases, hysteresis loss decreases, and low rolling resistance (fuel consumption ratio) becomes better. The resultant values in Table 5 were indexed based on the resultant values of Comparative Example 3, and thus, the higher numerical value means better results.

6) Processability Properties

By measuring the mooney viscosity (MV, (ML 1+4), @100° C. MU) of the first compound mixture obtained during preparing the rubber specimen, the processability properties of each polymer were comparatively analyzed, and in this case, the lower the measured value of the mooney viscosity is, the better the processability properties are. The resultant values in Table 5 were indexed (%) based on the resultant values of Comparative Example 3, and thus, the higher numerical value means better results.

Particularly, by using MV-2000 (ALPHA Technologies Co.) using Large Rotor at a rotor speed of 2±0.02 rpm at 100° C., each first compound mixture was stood at room temperature (23±3° C.) for 30 minutes or more, and 27±3 g was collected and put in a die cavity, and then, Platen was operated for 4 minutes for measurement.

TABLE 5

| Division | | Example | | | | | | | | Comparative Example | | | | | | | |
|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 |
| Tensile properties | 300% modulus | 101 | 100 | 102 | 99 | 101 | 98 | 99 | 100 | 88 | 85 | 100 | 109 | 98 | 100 | 100 | 85 |
| (Index, %) | Tensile strength | 110 | 109 | 108 | 106 | 105 | 110 | 109 | 107 | 115 | 120 | 100 | 98 | 103 | 107 | 105 | 112 |
| | Tensile rate | 115 | 116 | 113 | 110 | 109 | 114 | 110 | 103 | 126 | 130 | 100 | 95 | 105 | 103 | 108 | 120 |
| Abrasion resistance (Index, %) | | 123 | 124 | 125 | 120 | 120 | 123 | 125 | 122 | 115 | 116 | 100 | 105 | 118 | 110 | 120 | 113 |
| Viscoelasticity | tan δ at 0° C. | 102 | 100 | 101 | 102 | 100 | 99 | 100 | 101 | 85 | 86 | 100 | 102 | 99 | 98 | 95 | 86 |
| properties (Index, %) | tan & at 70° C. | 102 | 101 | 100 | 101 | 101 | 100 | 102 | 101 | 90 | 91 | 100 | 110 | 97 | 95 | 96 | 91 |
| Processability properties | | 111 | 108 | 109 | 111 | 110 | 115 | 111 | 115 | 111 | 110 | 100 | 90 | 108 | 105 | 110 | 109 |

As confirmed in Table 5, Examples 1 to 8 showed markedly excellent tensile properties, abrasion resistance, viscoelasticity properties and processability properties in balance when compared to Comparative Examples 1 to 8.

Particularly, Examples 1 to 8 showed somewhat reduced 300% modulus and rolling resistance when compared to Comparative Example 4, but showed markedly improved effects of tensile strength, tensile rate and abrasion resistance much higher than 10% increment, and showed improved effects for all properties when compared to Comparative Example 7. Through this, it could be confirmed that, since a derived unit from a vegetable oil in a polymer is present in a bonded type to a modified polymer chain, the oil-extended conjugated diene-based polymer according to the present invention could accomplish excellent properties including tensile properties, abrasion resistance, viscoelasticity properties and processability properties, simultaneously, which could not be accomplished in the conventional technique in which a common process oil or vegetable oil was compounded.

In addition, in Examples 1 to 8, it was confirmed that all properties were improved and at the same time, tensile strength and tensile rate were markedly improved when compared to Comparative Example 5, all properties were improved and at the same time, tensile rate and abrasion resistance were markedly improved when compared to Comparative Example 6, and all properties were excellent to equal or better levels, and abrasion resistance and viscoelasticity properties were markedly improved when compared to Comparative Example 8. Through this, it could be confirmed that the oil-extended conjugated diene-based polymer according to the present invention has a structure including a modified polymer chain and a derived unit from a vegetable oil bonded to the chain, and satisfies glass transition temperature properties and N and Si atom contents, and accordingly, achieves excellent tensile properties, abrasion resistance, viscoelasticity properties and processability properties at the same time, which could not be achieved in an oil-extended conjugated diene-based polymer which does not satisfy the aforementioned features.

The invention claimed is:

1. An oil-extended modified conjugated diene-based polymer comprising:
    a modified polymer chain comprising a repeating unit derived from a conjugated diene-based monomer and a functional group derived from an aminoalkoxysilane-based modifier; and
    a derived unit from a vegetable oil,
    wherein the modified polymer chain is coupling bonded with the derived unit from a vegetable oil,
    N and Si atoms are present in 100 ppm or more each based on a total weight of the polymer,
    the polymer possesses two glass transition temperatures, Tg1 and Tg2, measured by differential scanning calorimetry (DSC),
    the Tg1 is from −80° C. to −20° C., the Tg2 is from −50° C. to 30° C., and the Tg2 is higher than the Tg1.

2. The oil-extended modified conjugated diene-based polymer of claim 1, wherein the derived unit from a vegetable oil is present in 20 parts by weight to 60 parts by weight based on 100 parts by weight of the polymer.

3. The oil-extended modified conjugated diene-based polymer of claim 1, wherein the derived unit from a vegetable oil is present in 25 parts by weight to 40 parts by weight based on 100 parts by weight of the polymer.

4. The oil-extended modified conjugated diene-based polymer of claim 1, wherein the vegetable oil has a density of 0.90 g/cm³ to 0.95 g/cm³.

5. The oil-extended modified conjugated diene-based polymer of claim 1, wherein the Tg1 is from −60° C. to −30° C., and the Tg2 is from −40° C. to 20° C.

6. The oil-extended modified conjugated diene-based polymer of claim 1, wherein the vegetable oil includes one or more selected from the group consisting of soybean oil, rapeseed oil, canola oil, sunflower oil, linseed oil, rice bran oil, palm oil, olive oil, peanut oil, oil palm oil, cottonseed oil, and coconut oil.

7. The oil-extended modified conjugated diene-based polymer of claim 1, wherein the modified polymer chain further comprises a repeating unit derived from an aromatic vinyl-based monomer.

8. The oil-extended modified conjugated diene-based polymer of claim 1, wherein the polymer has molecular weight distribution of 1.0 to 2.0.

9. The oil-extended modified conjugated diene-based polymer of claim 1, wherein the aminoalkoxysilane-based modifier includes one or more selected from compounds represented by the following Formula 1 to Formula 3:

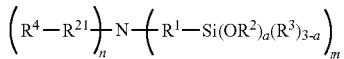
[Formula 1]

in Formula 1,
$R^1$ is a single bond, or an alkylene group of 1 to 10 carbon atoms,
$R^2$ and $R^3$ are each independently an alkyl group of 1 to 10 carbon atoms,
$R^4$ is hydrogen, an epoxy group, an alkyl group of 1 to 10 carbon atoms, an allyl group of 2 to 10 carbon atoms, a mono-substituted, di-substituted or tri-substituted alkylsilyl group with alkyl groups of 1 to 10 carbon atoms, or a heterocyclic group of 2 to 10 carbon atoms,
$R^{21}$ is a single bond, an alkylene group of 1 to 10 carbon atoms, or $-[R^{42}O]_j-$, where $R^{42}$ is an alkylene group of 1 to 10 carbon atoms, and j is an integer selected from 1 to 30,
a and m are each independently an integer selected from 1 to 3, and n is an integer of 0 to 2,

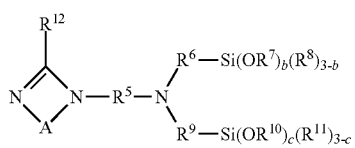
[Formula 2]

in Formula 2,
$R^5$, $R^6$ and $R^9$ are each independently an alkylene group of 1 to 10 carbon atoms,
$R^7$, $R^8$, $R^{10}$ and $R^{11}$ are each independently an alkyl group of 1 to 10 carbon atoms,
$R^{12}$ is hydrogen or an alkyl group of 1 to 10 carbon atoms,
b and c are each independently 1, 2 or 3, where b+c≥4 is satisfied, and A is

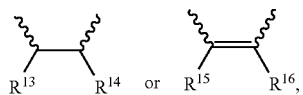

where $R^{13}$, $R^{14}$, $R^{15}$ and $R^{16}$ are each independently hydrogen or an alkyl group of 1 to 10 carbon atoms,

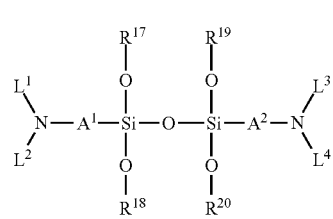
[Formula 3]

in Formula 3,
$A^1$ and $A^2$ are each independently a divalent hydrocarbon group of 1 to 20 carbon atoms, which includes or excludes an oxygen atom,
$R^{17}$ to $R^{20}$ are each independently a monovalent hydrocarbon group of 1 to 20 carbon atoms,
$L^1$ to $L^4$ are each independently a mono-substituted, di-substituted or tri-substituted alkylsilyl group with alkyl groups of 1 to 10 carbon atoms, or a monovalent hydrocarbon group of 1 to 20 carbon atoms, or $L^1$ and $L^2$, and $L^3$ and $L^4$ are connected with each other to form rings of 1 to 5 carbon atoms, respectively, and
if $L^1$ and $L^2$, and $L^3$ and $L^4$ are connected with each other to form rings, respectively, the rings formed comprise one to three of one or more heteroatoms selected from the group consisting of N, O and S.

10. A method for preparing the oil-extended modified conjugated diene-based polymer of claim 1, the method comprising:
polymerizing the conjugated diene-based monomer, or the conjugated diene- based monomer and an aromatic vinyl-based monomer, in the presence of a polymerization initiator in a hydrocarbon solvent to prepare an active polymer ;
reacting or coupling the active polymer with the aminoalkoxysilane-based modifier to prepare a modified polymer ; and
mixing the modified polymer with a vegetable oil .

11. The method for preparing the oil-extended modified conjugated diene-based polymer of claim 10, wherein the polymerization initiator is used in 0.01 mmol to 10 mmol based on total 100 g of monomers.

12. The method for preparing the oil-extended modified conjugated diene-based polymer of claim 10, wherein the modifier is used in 0.1 mol to 10 mol based on 1 mol of the polymerization initiator.

13. The method for preparing the oil-extended modified conjugated diene-based polymer of claim 10, wherein the vegetable oil is used in 20 parts by weight to 60 parts by weight based on 100 parts by weight of the modified polymer.

14. A rubber composition comprising the oil-extended modified conjugated diene-based polymer of claim 1; and a filler.

15. The rubber composition of claim 14, wherein the filler is one or more selected from a silica-based filler and a carbon black-based filler.

\* \* \* \* \*